May 10, 1932.  S. J. NORDSTROM  1,857,861
VALVE
Filed June 2, 1930
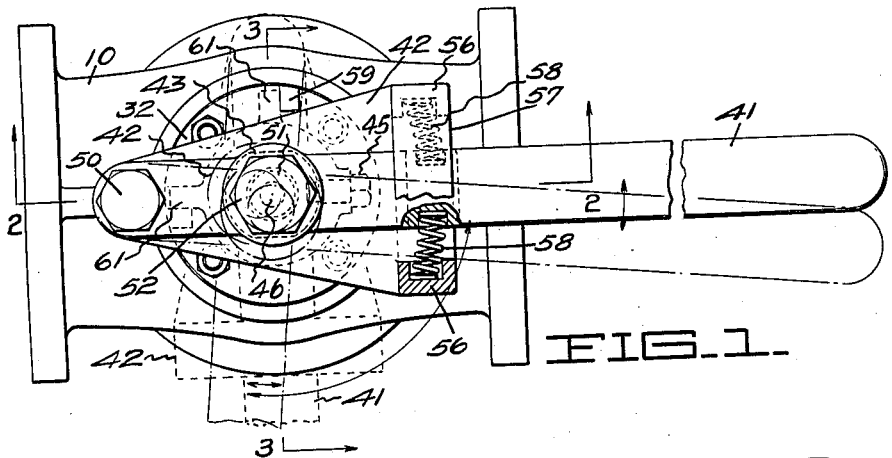
FIG_1_
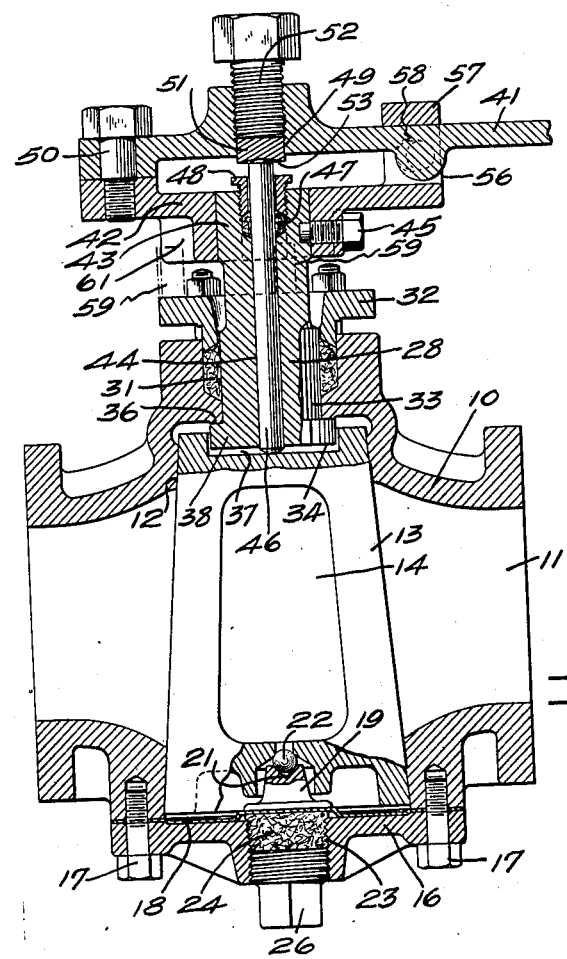
FIG_2_
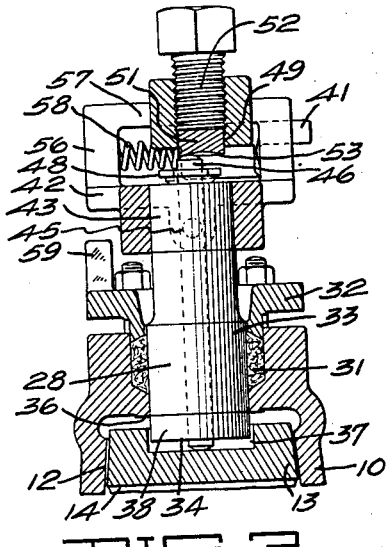
FIG_3_
INVENTOR.
Sven Johan Nordstrom
BY White, Prost, Fehr & Lothrop
ATTORNEYS.

Patented May 10, 1932

1,857,861

UNITED STATES PATENT OFFICE

SVEN JOHAN NORDSTROM, OF PIEDMONT, CALIFORNIA, ASSIGNOR TO MERCO NORDSTROM VALVE COMPANY, OF SAN FRANCISCO, CALIFORNIA, A CORPORATION OF DELAWARE

VALVE

Application filed June 2, 1930. Serial No. 458,993.

This invention relates generally to valves of the rotatable plug type, which have provision for effecting longitudinal jacking or unseating movement of the rotatable plug relative to its cooperating valve casing.

It is a general object of the invention to devise an improved valve of the above character in which the valve plug is automatically jacked or unseated when the plug is turned to different operating positions.

It is a further object of the invention to devise an improved valve of the above character which can be utilized under high temperature conditions, as for example to control flow of relatively high temperature oil. In this connection the valve of the present invention is characterized by the use of simple mechanical parts for applying longitudinal thrust to the valve plug, and which are not detrimentally affected by high temperature conditions.

It is a further object of the invention to devise a rotatable plug valve which is relatively simple in construction, which is cheap to manufacture, and which can be readily manipulated by an operator.

Further objects of the invention will appear from the following description in which the preferred embodiment of the invention has been set forth in conjunction with the accompanying drawings. It is to be understood that the appended claims are to be accorded a range of equivalents consistent with the state of the prior art.

Referring to the drawings:

Figure 1 is a plan view partly in cross section, illustrating a valve incorporating the present invention.

Fig. 2 is a side elevational view in cross section, taken along the line 2—2 of Fig. 1.

Fig. 3 is a cross sectional detail taken along the line 3—3 of Fig. 1.

The valve as illustrated in the drawings consists of a valve casing 10, provided with a passageway 11 for flow of fluid. A tapered bore or valve seat 12 is formed within the casing transversely of the fluid passageway 11. Positioned within the tapered bore there is a tapered plug 13 provided with a hole 14 which registers with passageway 11 for open position of the valve. The casing at the larger end of bore 12 is preferably closed, and for this purpose there is shown a closure member or plate 16, suitably secured to casing 11 as by means of cap screws 17.

The rotatable plug 13 is preferably resiliently urged in the direction of its smaller end, so that its periphery normally seals with the tapered seat or bore 12. As representative of means of this character which will give good results, there is shown a flexible metal diaphragm 18 having its peripheral edge portion clamped between member 16 and the casing 10. A member 19 projects from the central portion of diaphragm 18, and the inner end of this member 19 is provided with a cavity 21 substantially alined with the axis of rotatable plug 13. A ball 22 is disposed within cavity 21, and is interposed between the inner end of member 19 and the adjacent portion of plug 13. This ball serves both as a central bearing and as a means for transmitting thrust from member 19 to the plug. Closure member 16 is provided with a central opening 23 within which a suitable packing material 24 is disposed, as for example fiber asbestos or divided mica. Opening 23 is threaded to receive a threaded plug 26, so that by turning plug 26 the pressure upon packing 24 can be adjusted. Assuming that packing 24 is under considerable pressure, the tendency of this packing to expand forces diaphragm 18 inwardly toward plug 13, and causes member 19 to transmit a longitudinal thrust to the plug 13 thru ball 22, thus tending to resiliently urge the plug into its seat.

To permit turning of the plug 13, there is provided a head 28 which is carried by the casing 10 and which is rotatable upon an axis alined with the axis of plug 13. The outer end of head 28 is associated with suitable means such as will be presently described, for turning the same, and a suitable packing or equivalent expedient is utilized for preventing leakage between the head and the casing. Thus as shown in Figs. 2 and 3 suitable packing 31 surrounds head 28 and this packing can be compressed by an adjustable gland 32. The inner peripheral surface of packing 31 can seal against a peripheral surface 33 provided upon head 28.

As will be presently apparent, head 28 must be adapted to withstand considerable thrust tending to force it from the casing 10. To withstand such a thrust, the inner end of head 28 is shown provided with a shoulder 34, adapted to bear against a cooperating annular surface 36 formed upon the valve body 10.

A driving connection is provided between head 28 and plug 13, and this connection is preferably formed so that plug 13 can be moved longitudinally relative to both the head and the valve casing. Such a connection can be formed by providing a non-circular recess 37 in the small end of plug 13. The inner end portion 38 of head 28 projects into recess 37, and is also non-circular. As shown in both Fig. 2 and Fig. 3, sufficient overlap is provided between portion 28 and the adjacent portions of plug 13, so that the plug can be jacked longitudinally from its seat without disrupting the driving connection between the head and the plug. This driving connection between the head and the plug can also be described by stating that the inner end of the head and the small end of the plug have inter-engaging portions for turning the plug upon turning the head.

In the preferred form illustrated, the means utilized in conjunction with the above described structure for automatically effecting longitudinal jacking movement of the plug upon turning the plug to different positions, consists of an operating member 41 which is illustrated in the form of a manually operable handle or lever. This operating member or lever 41 has a lost motion connection with the outer end of head 28. In the particular type of connection shown casting 42 or other equivalent member is mounted upon the outer end 43 of head 28, this end portion 43 being squared or otherwise formed so that rotation of casting 42 will also rotate the head. Set screw 45 can be employed for permanently locking the casting 42 in position. The inner end of lever 41 is fulcrumed or pivotally connected to casting 42 as by means of cap screw 50.

In order to transmit a longitudinal thrust to the valve plug 13 responsive to relative turning movement between lever 41 and the head 28, the head is provided with a central longitudinal bore 44 thru which a rigid thrust pin 46 extends. The inner end of thrust pin 46 engages the smaller end of valve plug 13, while the outer end of the pin is in proximity to the lever 41. Pin 46 is slidable relative to the head 28, and leakage between the pin and the head can be prevented by providing suitable packing 47, adapted to be compressed by a gland 48. In order to cooperatively associate lever 41 with pin 46, that portion of the lever overlying the upper end of pin 46 is provided with a bore 49, within which is fitted a plug 51 of suitable material, such as hardened steel. Screw 52 is also shown threaded into bore 49 and engages the upper end of plug 51, whereby upon turning screw 52 the position of plug 51 can be adjusted. The lower face 53 of plug 51 is cupped as shown in Figs. 2 and 3, thus forming a cam surface, serving to engage the upper rounded end of pin 46.

In order to definitely limit turning movement of lever 41 relative to the head 28 and casting 42, spaced upstanding portions 56 are formed upon the upper surface of casting 42, upon either side of lever 41. The upper ends of these portions 56 are connected by a lateral portion 57 which is adapted to overlie and contact with the adjacent portion of lever 41, thus permitting the lever to apply relatively large force components longitudinally of pin 46. It is desirable to provide resilient means for normally returning lever 41 to a neutral position in which it is midway between portions 56, and in which plug 51 is alined with pin 46. For this purpose opposed compression springs 58 are interposed between lever 41 and portions 56.

Generally with a simple type of plug valve such as shown, it is desirable to limit turning movements of the valve plug to substantially 90 degrees. Thus spaced upstanding lugs 59 are provided upon the upper surface of clamps 32, and these lugs cooperate with a lug 61 provided upon casting 42.

To explain the mode of operation of the valve described above, it will be presumed that the valve plug is in closed position as shown in Fig. 2, and that the lever 41 is in neutral position as shown in Fig. 1. It is also presumed that the valve plug is properly seated within bore 12 under the urge of the resilient packing 24. If the valve plug has become fast within the casing, it may be difficult to turn the plug to open position by simply applying a turning torque directly to head 28. However by applying turning torque to lever 41, this lever initially turns relative to the head 28, so that cam surface 53 moves relative to the upper end of pin 46, as shown in Fig. 3. The result of such relative movement is to cause the plug 51 and thus the lever 41, to apply a longitudinal thrust to pin 46, which in turn applies a longitudinal thrust to the small end of the valve plug 13, to jack the plug loose from the casing. After such jacking movement, continuous turning movement of lever 41 serves to turn the valve plug to open position. If the valve plug now becomes fast in open position, the operation is substantially the same, in that the operator by turning lever 41 initially applies a thrust to pin 46, serving to unseat or jack the valve plug, after which continued turning movement of lever 41 turns the valve plug to closed position. After turning the valve plug to either closed or open position, release of lever 41 by the operator permits this lever to immediately return to initial position under the urge of springs 58, thus permitting the valve plug to properly seat within the casing.

It is characteristic of the construction described above that the longitudinal jacking thrust applied to the valve plug is dependent upon the torque applied to lever 41, and the torque applied to this lever is of course dependent upon the resistance to turning offered by the valve plug. Assuming that the plug is not fast in the casing and that little torque is required for turning the same, substantially no jacking movement will be effected upon turning lever 41. Furthermore after an initial jacking movement upon applying a turning torque to lever 41, the valve plug may turn so freely as to permit the upper end of pin 46 and plug 51 to return towards alined position during continuous movement of lever 41 to complete movement of the valve plug to either closed or open position. In the event that it is not desired to operate the valve by a single manipulation, or in the event of an emergency, it is possible to jack the valve plug from its seat without applying a torque to lever 41, by turning down screw 52.

It is apparent that this valve is of relatively simple construction, and because of the nature of the means employed for applying longitudinal thrust to the valve plug, it can be successfully operated at comparatively high temperatures. Furthermore since the parts for applying a thrust to the pin 46 are located externally of the valve casing, they are always open to inspection and adjustment, and they can be repaired or replaced without interrupting the fluid system with which the valve is employed.

I claim:

1. In a valve, a casing having a passageway therethrough for flow of fluid and a bore formed transversely of the passageway, a rotatable valve plug disposed within said bore, a head rotatably disposed in said casing, the inner end of said head having a driving connection with one end of the plug, a rigid member engaging said one end of the plug and extending into said head, means including an operating member located externally of said casing for applying a turning torque to said head, and means for applying a thrust to said rigid member upon initially applying a turning torque to said operating member in the same direction as the rotation which turns the plug, whereby said rigid member is caused to apply a longitudinal thrust to said plug.

2. In a valve, a casing having a passageway therethrough for flow of fluid and a bore formed transversely of the passageway, a rotatable valve plug disposed within said bore, a head rotatably disposed in said casing, the inner end of said head having a driving connection with one end of the plug, a rigid member engaging said one end of the plug and extending thru said head, an operating lever disposed laterally of said head externally of the casing, said lever being pivotally connected to the head, and means cooperating between said lever and the outer end of said rigid member to effect longitudinal movement of the rigid member upon pivotal movement of the lever relative to the head in the same direction as the rotation which turns the plug.

3. In a valve, a casing having a passageway therethrough for flow of fluid and a tapered bore formed transversely of the passageway, a tapered valve plug rotatably disposed within said bore, a head rotatably mounted in the casing axially of the plug, the inner end of the head having a driving connection with the small end of the plug which permits longitudinal unseating movement of the plug relative to the casing and the head, an operating member having a lost motion connection with the outer end of the head, and means actuated upon applying a turning torque to said member to apply a longitudinal thrust to said plug tending to unseat the same with respect to the bore.

4. In a valve, a casing having a passageway therethrough for flow of fluid and a tapered bore formed transversely of the passageway, a tapered valve plug rotatably disposed within said bore, a head rotatably mounted in the casing axially of the plug, the inner end of the head having a driving connection with the small end of the plug which permits longitudinal unseating movement of the plug relative to the casing and the head, means for resiliently urging the plug into seating engagement with the bore, an operating member having a lost motion connection with the outer end of the head, and means actuated upon applying a turning torque to said member to apply a longitudinal thrust to said plug tending to unseat the same with respect to the bore.

5. In a valve, a casing having a passageway therethrough for flow of fluid and a tapered bore formed transversely of the passageway, a tapered valve plug rotatably disposed within said bore, a head rotatably mounted in the casing axially of the plug, the inner end of the head having a driving connection with the small end of the plug which permits longitudinal unseating movement of the plug relative to the casing and the head, means for resiliently urging the plug into seating engagement with the bore, an operating member having a lost motion connection with the outer end of the head, a pin extending thru the head and movable longitudinally relative to the same, the inner end of the pin engaging the small end of the plug, and cam means serving to apply a longitudinal thrust to the outer end of the pin upon applying a turning torque to the operating member.

6. In a valve, a casing having a passageway therethrough for flow of fluid and a tapered seat or bore formed transversely of the passage, a tapered valve plug rotatably disposed within said bore, a head rotatably mounted in the casing axially of the plug, the inner end of the head and the small end of the plug having inter-engaging portions for turning the plug upon turning the head, said portions permitting longitudinal movement of the plug relative to the casing and head, an operating lever pivotally connected with the outer end of the head and extending laterally of the axis of the head, a thrust pin extending thru the head and movable longitudinally thereto, the inner end of the pin engaging the small end of the plug, means for resiliently urging the plug towards its smaller end and into engagement with the seat, and cam means for applying a thrust to the outer end of the pin upon applying a turning torque to said lever, turning of said lever in one direction serving to apply both a thrust to said pin to force the plug from its seat and also to turn the head and the plug.

7. In a valve, a casing having a passageway therethrough for flow of fluid and a tapered bore formed transversely of the passageway, a tapered valve plug rotatably disposed within said bore, said plug being movable longitudinally relative to the casing, a rotatable head mounted within the casing and extending axially of the plug, the inner end of said head having a driving connection with one end of the plug, an operating member pivotally connected to said head exterior of the casing, said pivotal connection being on an axis substantially parallel to but offset laterally from the axis of the head, and means cooperating between said member and said plug for exerting a longitudinal thrust upon said plug to jack the same upon initial turning movement of said member relative to the head.

In testimony whereof, I have hereunto set my hand.

SVEN JOHAN NORDSTROM.